F. H. MERRELL.
CUBE CUTTING MACHINE.
APPLICATION FILED APR. 29, 1913.
1,103,604.
Patented July 14, 1914.
4 SHEETS—SHEET 1.
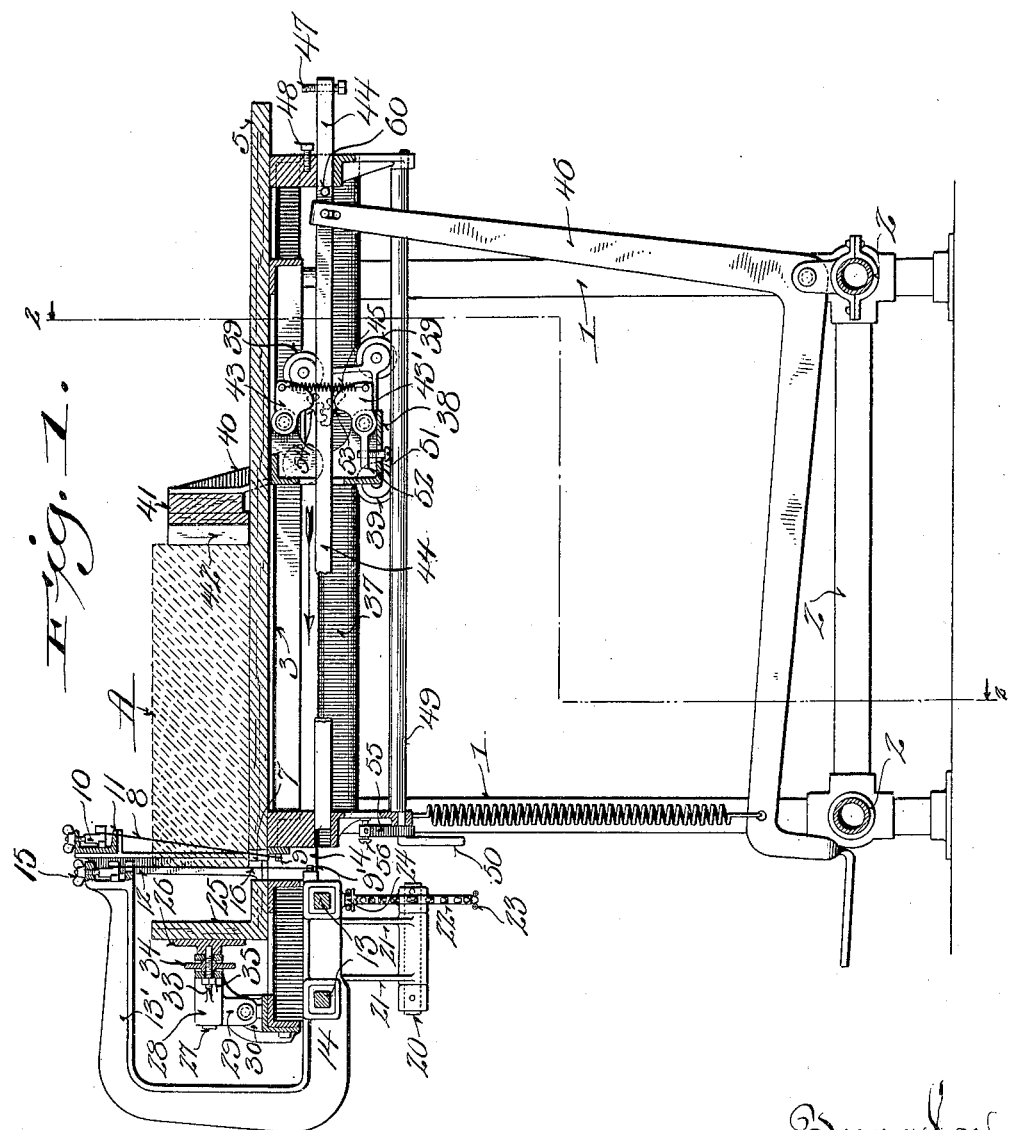

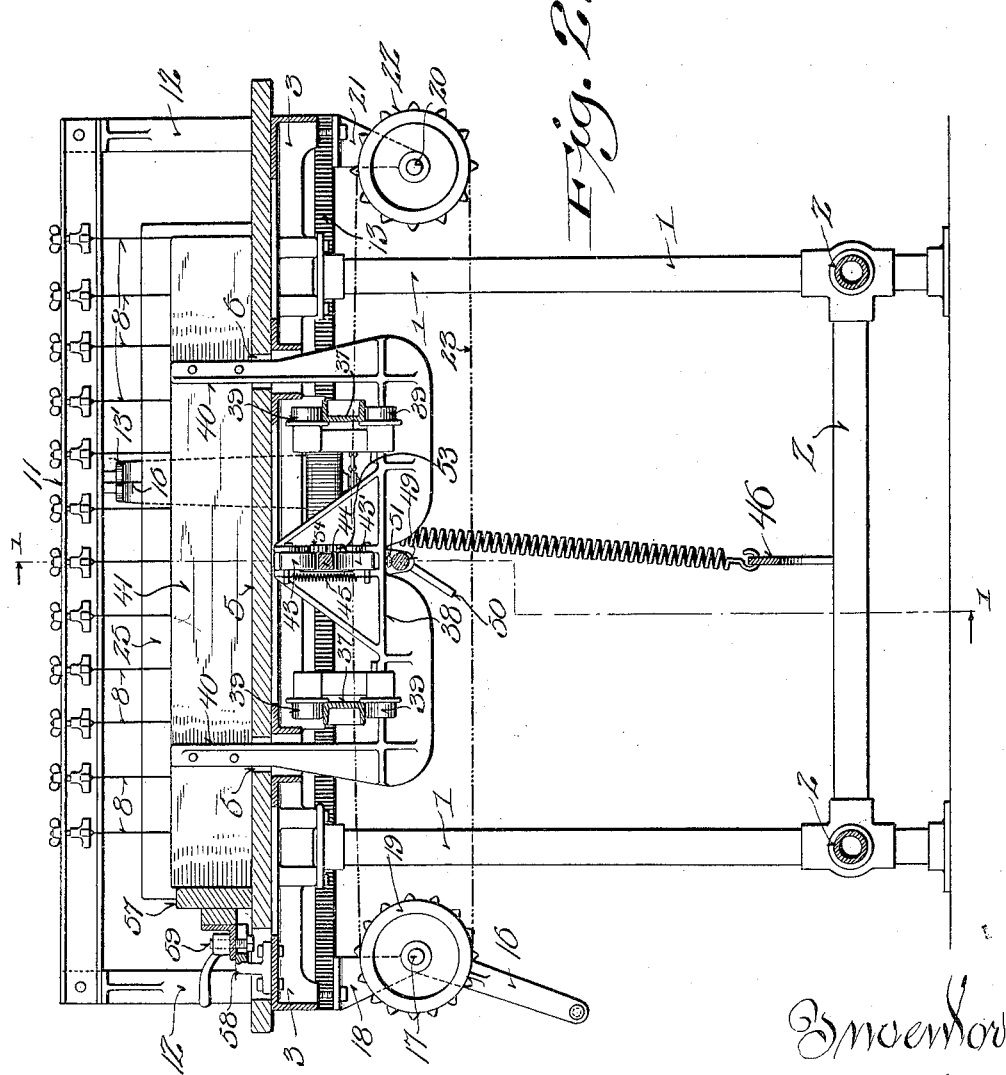

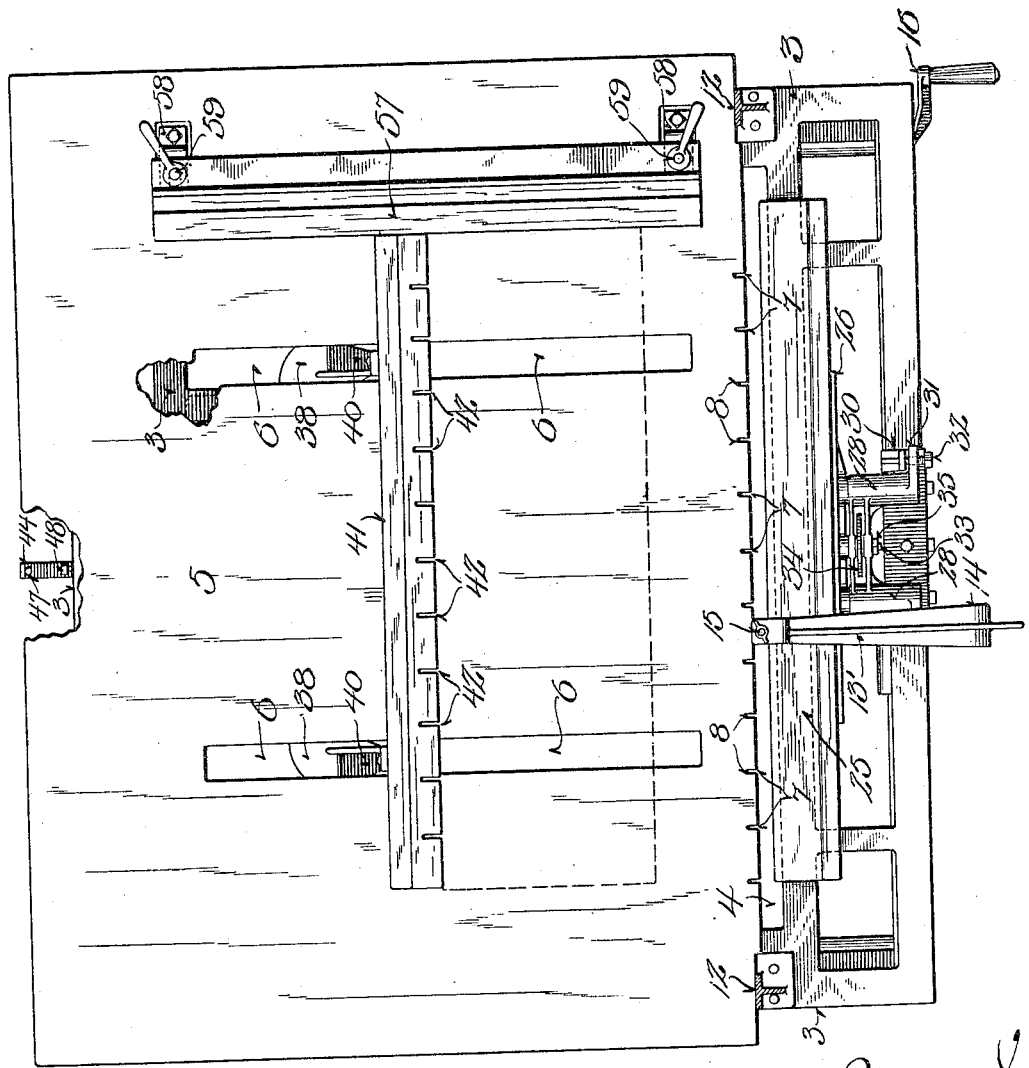

F. H. MERRELL.
CUBE CUTTING MACHINE.
APPLICATION FILED APR. 29, 1913.
1,103,604.
Patented July 14, 1914.
4 SHEETS—SHEET 4.
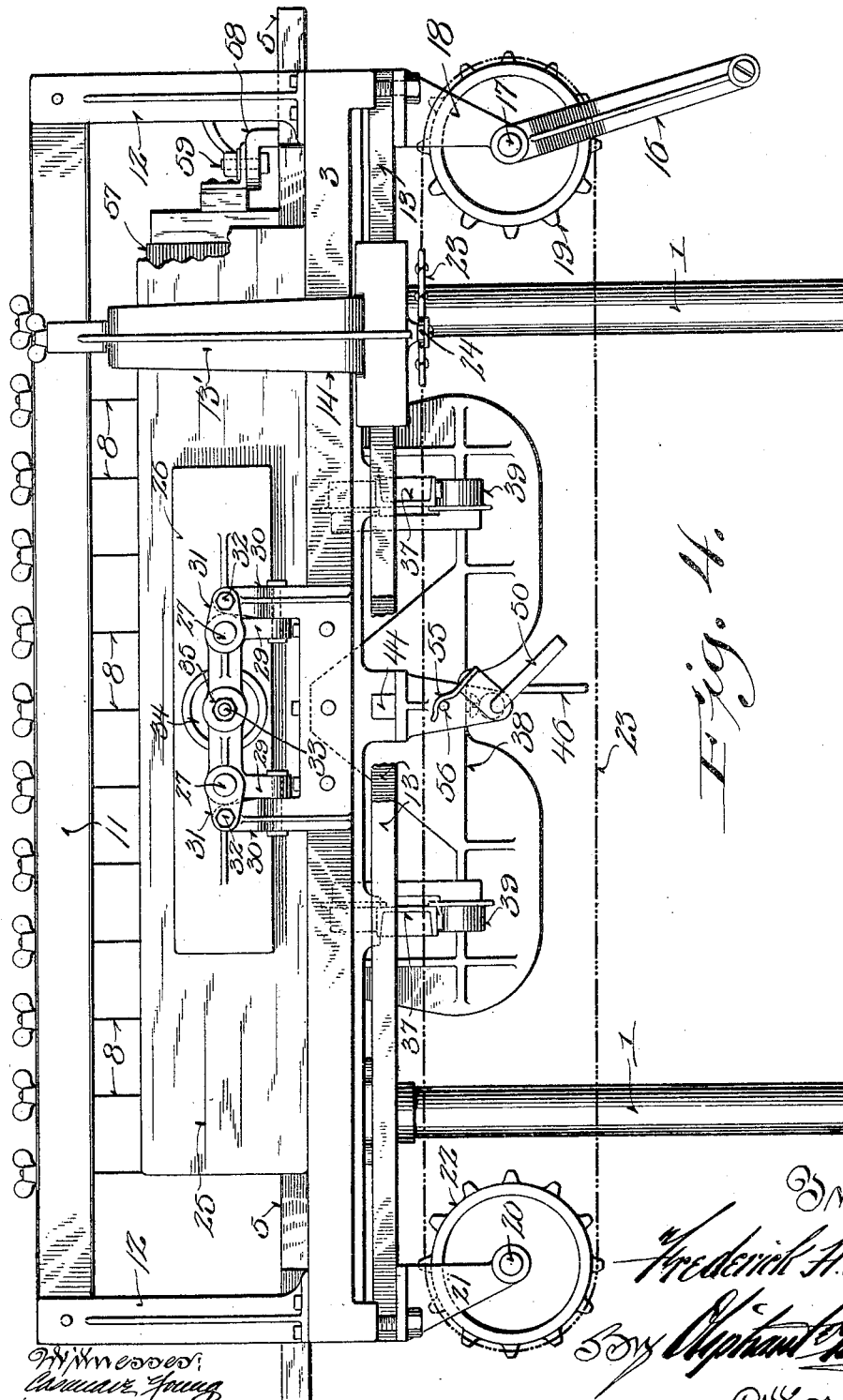

UNITED STATES PATENT OFFICE.

FREDERICK H. MERRELL, OF MILWAUKEE, WISCONSIN, ASSIGNOR TO PACKAGE MACHINERY COMPANY, OF SPRINGFIELD, MASSACHUSETTS, A CORPORATION OF MASSACHUSETTS.

CUBE-CUTTING MACHINE.

1,103,604.  Specification of Letters Patent.  Patented July 14, 1914.

Application filed April 29, 1913. Serial No. 764,410.

*To all whom it may concern:*

Be it known that I, FREDERICK H. MERRELL, a citizen of the United States, and resident of Milwaukee, in the county of Milwaukee and State of Wisconsin, have invented certain new and useful Improvements in Cube-Cutting Machines; and I do hereby declare that the following is a full, clear, and exact description thereof.

The primary object of my invention is to provide a simple, economical and accurate machine for cutting slabs of butter, ice-cream or other soft plastic material into cubes of predetermined dimensions or weight.

The specific objects of my invention are to provide a transversely movable follower strip and an intermittent feed mechanism therefor, whereby the slab of material is fed step by step at equal distances to a longitudinally alined gang of cutters to thus divide one edge of the slab into sections of predetermined breadth; to provide a one-way clutch mechanism for the feed mechanism, and means for releasing said clutch mechanism at the will of the operator, whereby the follower strip may be manually returned to a starting point after the series of step by step forward feed movements; to provide a receiving tray for the reception of the divided slab end after the same has been acted upon by the gang of cutters, the said tray being arranged parallel with the latter; to provide a longitudinally arranged reciprocative cutting member that is adapted to travel parallel with and between the tray and gang of cutters to sever the divided slab edge into cubes of predetermined equal dimensions and leave the series of severed cubes at rest upon the receiving tray; to provide means for adjusting the tray with relation to the reciprocative cutting member, whereby one dimension of the severed cubes of the slab is finely regulated; to provide means whereby the gang of alined fixed cutters present oblique cutting faces to the slab of material in order that a shearing cut will result to thus reduce sudden load strain that would otherwise occur co-incident to impact of parallel edges of the plastic material and cutting faces, and to provide an endless belt driven cutter head for the support of the single longitudinally disposed finishing cutter member.

With the above and other minor objects in view the invention consists in certain peculiarities of construction and combination of parts as set forth hereinafter with reference to the accompanying illustrations and subsequently claimed.

In the drawings Figure 1 represents a transverse sectional elevation of a cutting machine embodying the features of my invention, the section being indicated by line 1—1 of Fig. 2; Fig. 2, a longitudinal sectional elevation of the same, the section being taken upon a plane as indicated by line 2—2 of Fig. 1, looking from the rear of the machine; Fig. 3, a plan view of the machine with portions broken away and other portions in section to more clearly illustrate certain structural features, and Fig. 4, an enlarged detailed front elevation of the cutting machine with portions broken away.

Referring by characters to the drawings, 1, 1, represent legs suitably braced by tie-bars 2, the structure constituting a supporting frame for a skeleton bed 3, which bed is formed with a longitudinally arranged slot 4 adjacent to the working edge of a table 5, the same being suitably secured to the bed and is provided with a pair of transversely arranged slots 6, as shown. The working edge of the table is also provided with a series of transverse kerfs 7 at equal distances apart for the reception of an obliquely arranged series of strands of wire constituting cutters 8. The lower ends of the strand-cutters are secured to individual pins 9 carried by the bed and the upper terminals of said strands are secured to suitable keys 10 having threaded shanks that extend through apertures of a bridge-bar 11 and are secured by suitable thumb-nuts as shown, whereby the tension of the strands is regulated. The bridge-bar 11 which supports the alined series of cutters 8 is in turn supported by end-struts 12 that extend from the opposite ends of the bed 3. It should be understood that the cutter strands 8 are also spaced equal distances apart whereby the slab of material that is forced thereagainst is separated in equal divisions, which divisions protrude beyond the line of cutters preparatory to being separated from the slab.

Supported by the bed 3 and paralleling the slot 4, thereof is a pair of guide-rails 13, the same being arranged under said bed as best shown in Fig. 1. These rails form bearings for a reciprocative cutter head 14 having box extensions that are mounted upon said rails and a neck 13′ that extends upwardly and terminates adjacent to the bridge-bar 11, being in alinement with the bed-slot 4 as shown. Mounted in the end of this neck is an adjustable key 15 to which is connected one end of a cutting member 16, in the form of a wire strand, the said strand extending through the bed-slot 4 with its lower end connected to a pin 9′ that projects from one of the cutting head boxes. The key 15 constitutes a tightener for the cutting strand 16 and is secured by a thumb-nut that is in threaded engagement with the shank of said key. Thus it will be understood that the cutter head 13 is reciprocated back and forth, whereby the cutting member 16 carried thereby is arranged to travel back and forth in the slot 4 in juxtaposed position to the series of cutting members 8. Motion is imparted to the cutter head through a hand-crank 16 that is mounted upon an arbor 17, the same being journaled in a hanger 18 that depends from the bed 3, the said arbor carrying a sprocket-wheel 19 as best illustrated in Fig. 4. A similar arbor 20 is mounted in a hanger 21 that extends from the bed at the opposite end of the machine, which arbor carries a sprocket-wheel 22. The sprocket-wheels 19 and 22 have mounted thereon an endless chain-belt 23, one link of which is connected to the cutter head by a stud 24 that depends from one of the cutter head boxes, it being apparent that when the operator rotates the crank 16, in one direction, that the cutter-head will travel in a similar direction, a reversal of said crank movement, causing a reverse movement of the cutter head, which, as previously stated, is guided upon the longitudinally disposed rails 13, all of this mechanism being disposed forwardly of the working edge of the table.

Loosely seated upon the bed just forwardly of the working edge of the table is an L-shaped receiving tray 25, the edge of its base being alined with the bed-slot 4, while its vertical wall is adapted to abut a backing-plate 26. The backing-plate has a pair of stems 27 that extend horizontally therefrom, which stems are slidably supported in barrels of a bracket 28, the bracket being provided with depending lugs 29 that are in pivoted connection with ears 30 which project upwardly from an edge-bar of the bed-plate. As best shown in Figs. 3 and 4 the bracket 28 also has ears 31 that extend from its barrel portions, for the reception of locking bolts 32, which locking bolts are adapted to engage the ears 30. A reach portion of the bracket 28 is apertured for the reception of a threaded stud 33, which stud extends from the backing-plate 26 and is engaged by an adjusting wheel 34 that is mounted between bars of said reach. The outer end of the stud 33 also carries a locking-nut 35 for the purpose of binding the stud in an adjusted position.

By the above described connections it is obvious that the backing-plate 26 may be adjusted in or out by manipulation of the locking bolts 32, wheel 34 and locking nut 35, whereby the inner vertical tray wall may be set a predetermined distance from the cutting member 16 to accurately determine a width of cut.

The skeleton bed-plate 3 is provided with a pair of transversely disposed rails 37, upon which is mounted a slidable shoe 38 by means of anti-friction rollers 39 that engage the upper and lower faces of said rails. Legs 40 extend upwardly from the shoe through the table-slots 6 and have connected thereto a longitudinally arranged follower strip 41. The working face of this strip is provided with a series of kerfs 42 which are alined with the series of cutting members 8, whereby the face of said follower strip is capable of being extended beyond the alined series of cutting members 8 to thus increase the scope of adjustment and permit the follower strip to feed the article being cut, to a proper position with relation to the cutting members.

As best shown in Figs. 1 and 2 the shoe 38 has pivoted thereto, upper and lower cam-faced clutching members 43, 43′, which are arranged to engage a plunger-rod 44, when the latter is moved forwardly or in the direction as indicated by the arrow in Fig. 1, the shoe being suitably apertured to permit its travel back and forth about said plunger-rod. The clutching members 43 are connected by a delicate coiled spring 45, whereby their cam-faces are normally drawn together to effect a pinching engagement with the plunger-rod, said clutching faces constituting a one-way clutch mechanism, whereby when the rod is moved in the direction of the arrow, it will cause the shoe 38 to travel therewith, together with the follower strip.

Intermittent forward movement of the plunger-rod is effected through a spring-controlled bell-crank foot-lever, which lever is fulcrumed to one of the truss-bars of the supporting frame and has an arm 46 that is connected to the plunger-rod through a pin and slot engagement, it being understood that said plunger-rod is slidably mounted in front and rear webs of the bed-plate. In order to limit forward movement of the plunger-rod the rear end thereof is provided with a projecting pin or lug 47 that engages a stop-head 48, which head may be, as shown, adjustably connected to the stationary bed-plate, whereby forward movement of the rod can be finely regulated in assemblage. Hence it is apparent that with each treadle movement of the bell-crank lever, the follower strip will be moved forwardly upon the table step by step, these intermittent movements being of equal distances and after each forward movement the spring-controlled bell-crank lever will cause retraction of the plunger-rod to its normal position of rest, and owing to the angular disposition of the pivoted clutch members when said rod is retracted clutching engagement between these members and said rod will be released, whereby the shoe will remain in its forwardly adjusted position, there being sufficient friction of the parts to prevent back-lash of the follower-strip incidental to retraction of the plunger.

After the follower strip has completed its series of forward step by step movements, the same must be returned to its normal starting position for the purpose of receiving an uncut slab of material and with this in view, means is provided for manually releasing the clutch members 43, 43', from engagement with the plunger-rod, which means comprises a transversely arranged universal release bar 49 that is eccentrically pivoted in ears depending from the bed-plate, one end of the bar being provided with a hand-crank 50, whereby said bar is oscillated. This bar is arranged under the shoe 38 in such position that when it is oscillated in one direction it will engage an adjustable pin 51 that forms an extension of a tail-piece 52 of the lower clutch member 43'. Hence when the rod is so rotated that the pin carried by the tail-piece of the clutch member is engaged it is apparent said clutch-member will be oscillated to free its clutching face from the plunger-rod, in which position it is shown in Fig. 1. When this oscillation of the clutch-member 43' takes place it is simultaneously transmitted to the upper clutch member 43 through a segmental gear 53 carried by the lower member that is meshed with a corresponding segmental gear 54 carried by the upper clutch member, these gear segments being offset from the cam-faces of the clutch-member, whereby they clear the plunger rod.

When the clutch release bar 49 is actuated to free the shoe from engagement with the plunger-rod it is locked in its position by a spring-snap 55 that engages a pin 56, which projects from the bed-piece adjacent to the release-bar lever 50 as best shown in Fig. 4.

The table 5 is provided with a gage-strip 57, which is arranged transversely thereof and adapted to abut one end of the follower strip 41 whereby two sides of a rectangular slab of butter or other material to be cut into blocks, is properly adjusted, it being understood that such slabs are preferably formed into blocks, the areas of which are of such dimensions that they will divide into a number of bricks of equal dimensions. The gage-strip is secured to slotted tongues 58 that extend from the bed-plate, through apertures in the table, the tongue being engaged by suitable clamping-bolts 59, which bolts pass through apertures that are formed in angle-iron extensions of the gage-strip. Hence said gage-strip can be adjusted accurately against the adjacent end of the follower-strip, the distance between said gage-strip and first kerf 42 of the follower-strip being equal to one dimension of a cube to be cut from the body of the slab. Thus no trimming of the first slab is required, although it should be understood that this edge of the slab, which abuts the gage-strip may be trimmed, if desired, by providing an additional cutting member 8 at the gage end of the machine.

In the operation of the machine, presuming that a slab of butter A is adjusted to the follower strip and gage-strip, of sufficient width to be divided into a number of bricks without trimming the front edge, the first operation is to adjust said front edge of the slab A in alinement with the travel of the single cutter 16. This adjustment of the slab is effected by releasing the clutch mechanism, whereby the shoe and follower-strip 41 can be manually shifted forwardly to the desired point. Thereafter the release bar 49 is actuated, whereby the clutch members are released to effect clutching engagement with the plunger-rod. The operator then actuates the foot-lever causing the plunger-rod to move forward its full throw, which throw is equal to one dimension of the cube to be cut. The follower strip, moving with the plunger-rod, will thus cause the slab of butter to be forced through the alined gang of cutting members 8, whereby said butter is divided into a series of equal undetached sections. Should there be a surplus extending beyond the ungaged edge of the slab, it is apparent that this surplus will be trimmed off by the last cutting strand 8 of the series. These undivided sections of the slab are forced forwardly into the receiving tray with the edge faces thereof abutting the inner vertical wall of said tray which forms a gage, in conjunction with the single cutting member 16, that serves to sever said undivided sections. It is understood that during this operation the cutter-head is at one or the other of its extreme positions and clear of the mass of butter that is being fed forward. The operator then releases the foot-lever, whereby the plunger-rod returns to its normal position of rest, being limited in its backward movement by a stop-pin 60, which engages a face of the bed-plate. Thereafter the operator manipulates the hand-crank 16 and through its gear connection with the cutter-head the latter is moved across the path of travel of the slab of butter and in its travel the unsevered sections that are now resting within the receiving tray are separated. In the next operation the receiving tray 25 together with its contents is removed from its seat by first swinging the bracket 28 about the pivotal points, whereby said bracket and backing strip are cleared from their abutting position with relation to the receiving tray, the same being then readily lifted due to the fact that the overhanging neck portion of the cutter-head is clear of the tray ends. Thereafter the step by step forward movement of the follower is repeated until the entire slab has been separated into cubes of equal dimensions or weight. Should a slab of material be adjusted to the follower strip of unknown dimensions, it is apparent that the free front edge and end edge may be initially trimmed by releasing the follower strip shoe from its clutched engagement with the plunger-rod, whereby the slab is trued upon the two exposed edges preparatory to a step by step cutting operation by which it is severed into blocks or cubes, it being understood that said slabs are of uniform thickness.

It is apparent from the foregoing description that provision is made for accurate adjustment of all of the parts, whereby the slabs of material of uniform density may be absolutely cut into cubes of equal weight, and while I have described the machine as particularly applicable to butter it is obvious that any soft, plastic material can be severed into blocks or bricks with equal efficiency.

I claim:

1. A cube-cutting machine comprising a table, a series of alined fixed cutters adjacent to one edge thereof, a reciprocative head disposed beyond the fixed line of cutters, a cutting member carried thereby, an endless belt actuating means for the cutter head, a portable tray disposed beyond the reciprocative cutter, means for adjusting the tray relative to said reciprocative cutter, a follower strip mounted upon the table, a feed mechanism for the follower strip, and a fixed gage-strip carried by the table in juxtaposition to one end of the follower strip.

2. A cube-cutting machine comprising a skeleton frame having a series of vertically alined stationary cutting members disposed across the face of the table at its feed edge, a guide-rail arranged parallel with the feed edge of said table and under the same, a cutter-head reciprocatively mounted upon the guide-rail having a neck projecting above the face of said table, a single vertically disposed cutting member connecting the shank and neck of the cutter-head, the cutter member being extended across the plane of the face of said table beyond the fixed cutting members, a longitudinally disposed L-shaped receiving tray mounted upon the skeleton frame beyond the sets of cutting members, a follower strip mounted upon the table, and means for feeding the follower strip.

3. A cube-cutting machine comprising a skeleton frame having a transverse slot therein, a table mounted upon the frame having a feed edge juxtaposing the frame slot, a series of vertically alined fixed cutting members extending through the frame slot adjacent to the feed edge of the table, a guide-rail carried by the frame paralleling the slot therein and under the same, a receiving tray supported by the frame beyond the slot, the bottom of which tray is upon the same plane as the table, a cutter-head mounted upon the guide-rail having a neck projecting upwardly and over the tray, a single vertical cutting member extending through the frame slot connecting the neck and shank of the cutter-head, means for imparting horizontal reciprocative movement to the cutter-head whereby its cutting member is caused to travel back and forth within the frame slot, a follower strip mounted upon the table, and means for feeding the follower strip.

4. A cube-cutting machine comprising a skeleton frame having a transverse slot therein, a table mounted upon the frame having a feed edge juxtaposing the frame slot, a series of vertically alined fixed cutting members extending through the frame slot adjacent to the feed edge of the table, a guide-rail carried by the frame paralleling the slot therein and under the same, a receiving tray supported by the frame beyond the slot, an adjustable backing-plate for the tray, the bottom of which tray is upon the same plane as the table, a cutter-head mounted upon the guide-rail having a neck projecting upwardly and over the tray, a single vertical cutting member extending through the frame slot connecting the neck and shank of the cutter-head, means for imparting horizontal reciprocative movement to the cutter-head whereby its cutting member is caused to travel back and forth within the frame slot, a follower strip mounted upon the table, and means for feeding the follower strip.

5. A cube-cutting machine comprising a table, a series of alined fixed cutters adjacent to one edge thereof, a reciprocative head disposed beyond the fixed line of cutters, a cutting member carried thereby, an endless belt actuating means for the cutter head, a tray disposed beyond the reciprocative cutter, means for adjusting the tray relative to said reciprocative cutter, a follower strip mounted upon the table, a feed mechanism for the follower strip, and a gage-strip carried by the table in juxtaposition to one end of the follower strip.

In testimony that I claim the foregoing I have hereunto set my hand at Milwaukee in the county of Milwaukee and State of Wisconsin in the presence of two witnesses.

FREDERICK H. MERRELL.

Witnesses:
  GEO. W. YOUNG,
  M. E. DOWNEY.

Copies of this patent may be obtained for five cents each, by addressing the "Commissioner of Patents, Washington, D. C."